(12) United States Patent
Singleton et al.

(10) Patent No.: US 9,928,857 B2
(45) Date of Patent: Mar. 27, 2018

(54) METHOD OF MAKING A BOTTOM SHIELD STABILIZED MAGNETIC SEED LAYER

(71) Applicant: Seagate Technology LLC, Cupertino, CA (US)

(72) Inventors: Eric Walter Singleton, Maple Plain, MN (US); Liwen Tan, Eden Prairie, MN (US); Jae-Young Yi, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 154 days.

(21) Appl. No.: 14/799,354

(22) Filed: Jul. 14, 2015

(65) Prior Publication Data

US 2015/0318004 A1 Nov. 5, 2015

Related U.S. Application Data

(62) Division of application No. 13/844,813, filed on Mar. 16, 2013, now abandoned.

(51) Int. Cl.
| | |
|---|---|
| G11B 5/127 | (2006.01) |
| H04R 31/00 | (2006.01) |
| G11B 5/31 | (2006.01) |
| G11B 5/39 | (2006.01) |
| G11B 5/115 | (2006.01) |

(52) U.S. Cl.
CPC ............ *G11B 5/3116* (2013.01); *G11B 5/115* (2013.01); *G11B 5/3163* (2013.01); *G11B 5/398* (2013.01); *G11B 5/3912* (2013.01); *G11B 2005/3996* (2013.01); *Y10T 156/10* (2015.01)

(58) Field of Classification Search
CPC .... G01R 33/093; G11B 5/398; G11B 5/3912; G11B 5/115; G11B 5/3163; G11B 5/3116; B82Y 25/00
See application file for complete search history.

(56) References Cited

U.S. PATENT DOCUMENTS

| | | | |
|---|---|---|---|
| 7,606,007 B2 | 10/2009 | Gill | |
| 7,706,108 B2 | 4/2010 | Gill | |
| 7,768,747 B2* | 8/2010 | Kagami | B82Y 25/00 29/603.15 |
| 7,916,430 B2* | 3/2011 | Kagami | G11B 5/3163 360/319 |
| 7,961,438 B2 | 6/2011 | Mizuno et al. | |
| 7,974,048 B2 | 7/2011 | Shimazawa et al. | |
| 8,049,997 B2 | 11/2011 | Miyauchi et al. | |
| 8,189,303 B2 | 5/2012 | Hara et al. | |
| 8,230,583 B2* | 7/2012 | Lille | G11B 5/11 216/22 |
| 8,305,715 B2 | 11/2012 | Mauri et al. | |

(Continued)

FOREIGN PATENT DOCUMENTS

JP 2013-008439 A 1/2013

*Primary Examiner* — Paul D Kim
(74) *Attorney, Agent, or Firm* — Hall Estill Attorneys at Law

(57) ABSTRACT

A data reader generally capable of sensing data bits may be configured at least with a magnetic stack that has free and fixed magnetization structures atop a magnetic seed layer. A bottom shield may be positioned contactingly adjacent the magnetic stack opposite a top shield with the bottom shield having a fixed pinning magnetization set to a predetermined magnetic orientation.

17 Claims, 3 Drawing Sheets

(56) References Cited

U.S. PATENT DOCUMENTS

| | | | | |
|---|---|---|---|---|
| 8,369,048 B2 * | 2/2013 | Miyauchi | ............... | B82Y 10/00 |
| | | | | 360/319 |
| 8,879,213 B2 * | 11/2014 | Isowaki | ............... | G11B 5/3163 |
| | | | | 360/319 |
| 8,921,126 B2 * | 12/2014 | Quan | ..................... | H01L 43/12 |
| | | | | 257/295 |
| 9,281,469 B2 * | 3/2016 | Quan | ..................... | H01L 43/12 |
| 9,390,735 B1 * | 7/2016 | Wang | ................... | G11B 5/3912 |
| 9,442,171 B2 * | 9/2016 | Singleton | ............. | G01R 33/093 |
| 9,633,679 B2 * | 4/2017 | Singleton | ............. | G11B 5/3912 |
| 2003/0137785 A1 | 7/2003 | Saito | | |
| 2007/0195467 A1 | 8/2007 | Gill | | |
| 2009/0034132 A1 * | 2/2009 | Miyauchi | ............... | B82Y 25/00 |
| | | | | 360/324 |
| 2009/0174968 A1 | 7/2009 | Singleton et al. | | |
| 2009/0279213 A1 | 11/2009 | Wu et al. | | |
| 2010/0027168 A1 | 2/2010 | Chou et al. | | |
| 2010/0039734 A1 | 2/2010 | Hara et al. | | |
| 2010/0149689 A1 | 6/2010 | Tsuchiya et al. | | |
| 2011/0007427 A1 | 1/2011 | Qiu et al. | | |
| 2011/0007429 A1 | 1/2011 | Dimitrov et al. | | |
| 2011/0051291 A1 | 3/2011 | Miyauchi et al. | | |
| 2012/0063035 A1 | 3/2012 | Childress et al. | | |
| 2012/0087046 A1 | 4/2012 | Yanagisawa et al. | | |
| 2012/0250189 A1 | 10/2012 | Degawa et al. | | |
| 2012/0327537 A1 | 12/2012 | Singleton et al. | | |

* cited by examiner

METHOD OF MAKING A BOTTOM SHIELD STABILIZED MAGNETIC SEED LAYER

RELATED APPLICATION

This application is a divisional of U.S. patent application Ser. No. 13/844,813 filed on Mar. 16, 2013, now abandoned.

SUMMARY

Various embodiments are generally directed to a transducing element capable of reading data bits at least from a rotating data storage medium.

In accordance with some embodiments, a magnetic stack may have free and fixed magnetization structures atop a magnetic seed layer. A bottom shield may be positioned contactingly adjacent the magnetic stack opposite a top shield with the bottom shield having a fixed pinning magnetization set to a predetermined magnetic orientation.

DETAILED DESCRIPTION

Faster data access and higher data capacity in data storage devices with reduced form factors has corresponded with data transducing components formed on a microscopic scale. The minimization of magnetic layers and shields in a data reading element can contribute to the production of noise that can degrade magnetic performance. Added emphasis on reducing the physical size of a magnetic lamination while maintaining separate magnetic operation of shields and data sensing layers has corresponded with volatile magnetic stability that jeopardizes reliable data reading. Hence, industry continues to strive for physically smaller data reading laminations that are magnetically stable with minimal noise production during operation Accordingly, a data reader may be configured at least with a magnetic stack having free and fixed magnetization structures atop a magnetic seed layer with a bottom shield contactingly adjacent the magnetic stack opposite a top shield and the bottom shield configured with a fixed pinning magnetization set to a predetermined magnetic orientation. The ability to tune the fixed pinning magnetization allows for the stabilization of the magnetic seed of the magnetic stack. Such stabilization can lead to optimized magnetic stack performance as stray magnetic fields are less likely to produce noise and affect free magnetization structure operation.

Figure 1:
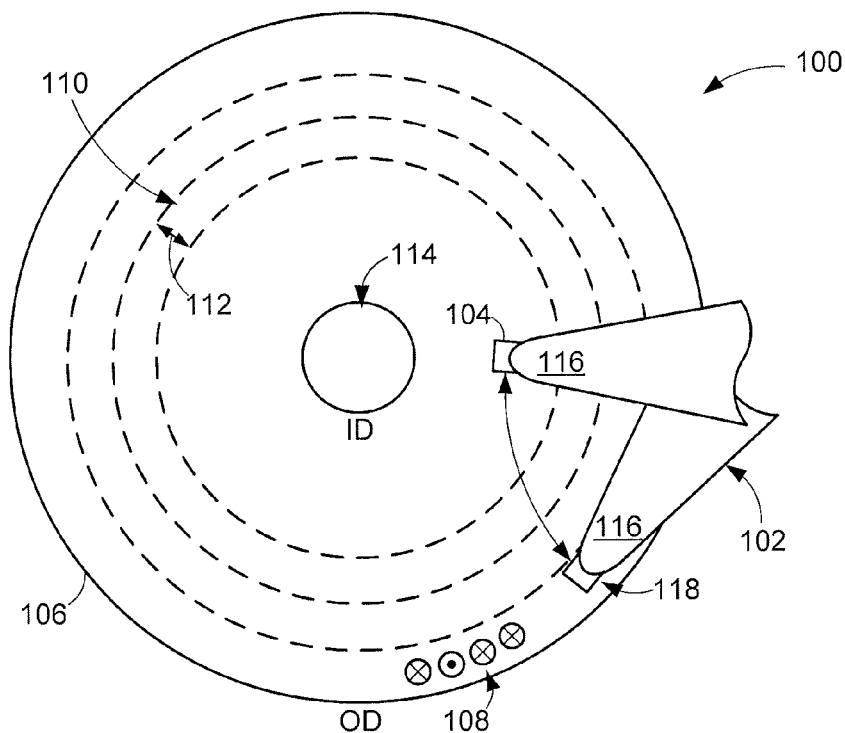
FIG. 1 is a block representation of an example portion of a data storage device configured and operated in accordance with some embodiments.

A tuned bottom shield and stabilized magnetic seed layer may be utilized in an unlimited variety of data storage environments, but FIG. 1 displays a top view block representation of an example data storage device 100 environment configured in accordance with some embodiments. While not limiting or required, the data storage device 100 has an actuating assembly 102 that is capable of positioning a transducing head 104 over a variety of locations on a magnetic storage media 106 where stored data bits 108 are located on predetermined data tracks 110. Each data track 110 may be configured with a width 112 that corresponds with an areal density that determines the storage capacity of the media 106.

Movement of the storage media 106 can be facilitated through attachment to one or more spindle motors 114 that rotate during use to produce an air bearing surface (ABS) on which a slider portion 116 of the actuating assembly 102 flies to position a head gimbal assembly (HGA) 118, which includes the transducing head 104, over a predetermined portion of the media 106. The transducing head 104 can be configured with one or more transducing elements, such as a magnetic writer, magnetically responsive reader, and magnetic shields, which operate to program and read data from the selected data tracks 110 of the storage media 106, respectively. In this way, controlled motion of the actuating assembly 102 correspond with alignment of the transducers with the data tracks 110 defined on the storage media surfaces to write, read, and rewrite data.

Figure 2:
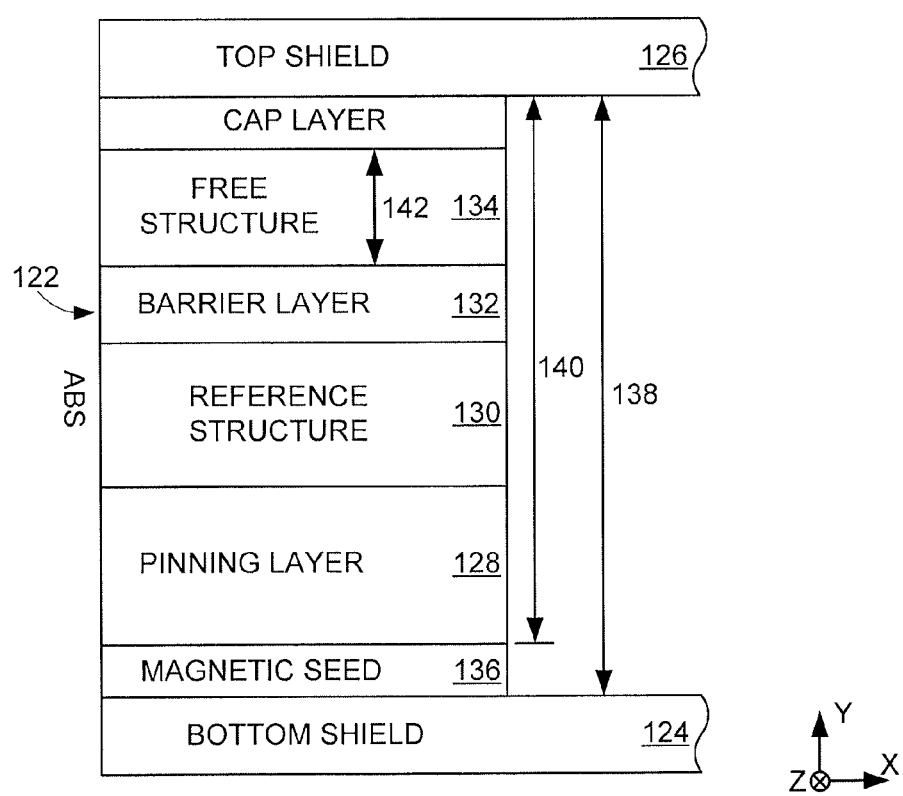
FIG. 2 shows a cross-sectional block representation of a portion of an example transducing element capable of being used in the data storage device of FIG. 1.

FIG. 2 shows a cross-sectional block representation of an example transducing element 120 capable of being used in the data storage device 100 of FIG. 1. The transducing element 120 has a magnetic stack 122 disposed between bottom 124 and top 126 magnetic shields on an ABS. The magnetic stack 122 can be characterized as a spin valve due to the presence of a fixed magnetization pinning layer 128 contacting a fixed magnetization reference structure 130 opposite a non-magnetic barrier layer 132 from a magnetically free structure 134 with the structures 130 and 134 each possibly being single layers and laminations of magnetic and non-magnetic sub-layers. The non-magnetic barrier layer 132 may be formed as an oxide barrier like MgO and alumina or, alternatively, be constructed as spacer layer of non-magnetic material, such as Cu or Ag.

As the free structure 134 responds to an external data bit while the reference structure 130 maintains a fixed magnetization due to coupling with the pinning layer 128, an external data bit can be read as a logic state. Through various tuned configurations, a magnetic seed 136 can be positioned on opposite sides of the stack 122 to provide predetermined grain growth and magnetic properties, such as anisotropy, in the pinning layer 128. Construction of the spin valve magnetic stack 122 can have a physical shield-to-shield spacing 138, magnetic shield-to-shield spacing 140 used to determine P50 measurements, and free structure thickness 142 that determines the magnetic extent of the magnetic stack 122 and the possible data track resolution.

The magnetic stack 122 may be configured, as shown, with a magnetic seed 136 that can act as a magnetic shield and reduce the effective magnetic shield-to-shield spacing 140 of the transducing element 120. However, the inclusion of the magnetic seed 136 may induce magnetic volatility as stray magnetic fields inadvertently shift the magnetization of the magnetic seed 136, which can be problematic in data storage environments where the data bits are densely packed and stray magnetic fields can be prevalent and relatively intense. The inadvertent magnetic domain movement of the magnetic seed 136 and resultant noise that can degrade magnetic stack 122 performance from the presence of stray magnetic fields has emphasized an ability to stabilize the magnetic seed 136 without adding to the magnetic shield-to-shield spacing 140 of the transducing element 120. Thus, the bottom shield 124 can be configured to stabilize the magnetic seed 136 and optimize magnetic stack 122 magnetic operations by minimizing the magnetic seed's 136 sensitivity to stray magnetic fields.

It should be noted that the term "stack" is an unlimited term within this disclosure that can be one or more vertically and horizontally aligned layers, constructed of magnetic and non-magnetic material that are capable of magnetic reading. Throughout the present application, the term "stack" will be understood to mean a component that is constructed to respond to external data bits. For example, but not in any way limiting, a magnetic stack may be a data reader that can differentiate between a plurality of data bits.

Figure 3:
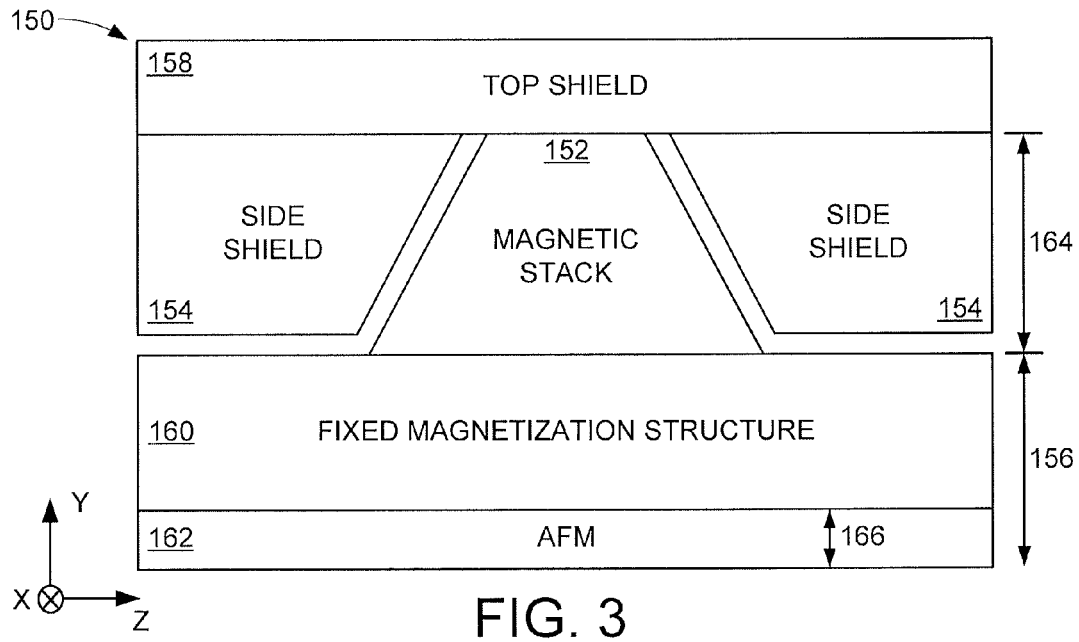
FIG. 3 displays an air bearing view block representation of a portion of an example data reader constructed in accordance with various embodiments.

FIG. 3 generally illustrates an air bearing view block representation of an example data reader 150 with such a configuration. As shown, the data reader 150 has a magnetic stack 152 disposed between lateral side shields 154 and vertically between bottom 156 and top 158 shields. The bottom shield 156 has a fixed magnetization structure 160 that may be a single ferromagnetic layer or a lamination of magnetic and non-magnetic sub-layers which is fixed by an antiferromagnet (AFM) 162. The fixed magnetization provided by the AFM 162 and fixed magnetization structure 160 can stabilize portions of the magnetic stack 152 and allow for a reduced shield-to-shield spacing as reference structures of the magnetic stack can have decreased thicknesses The tuned thickness 166 of the AFM layer 162 can provide fixed magnetization for the bottom shield 156 that maintains shield functionality for blocking stray magnetic fields while stabilizing both the fixed magnetization structure 160 and the magnetic stack 152. Through various embodiments, the AFM layer 162 can be further tuned for material and coercivity to provide a predetermined magnetic strength and orientation to set the magnetization of the bottom shield 156 and fixed magnetization structure 160 without interfering with the ability of the magnetic stack 152 to accurately sense external data bits.

Figure 4:
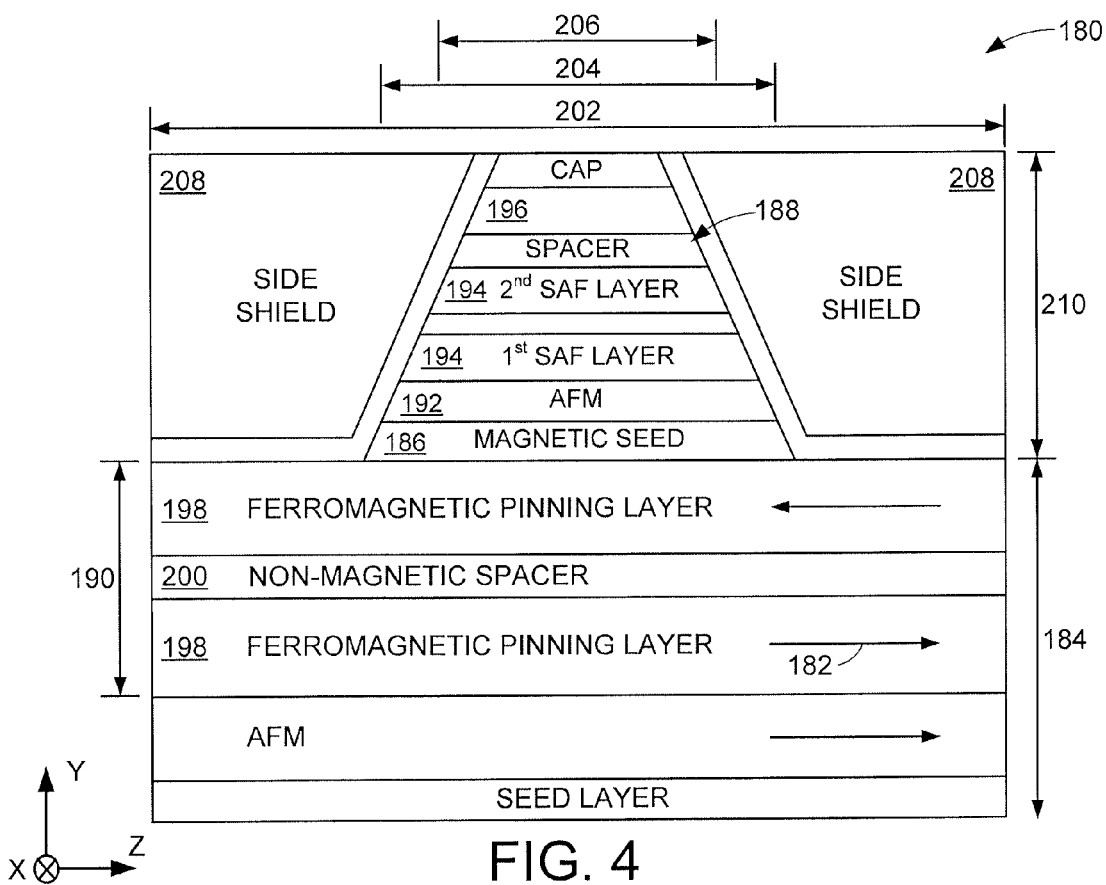
FIG. 4 shows an air bearing portion of an example transducing element configured in accordance with some embodiments.

FIG. 4 displays an air bearing view block representation of a portion of an example transducing element 180 constructed in accordance with various embodiments to produce a fixed shield magnetization 182 in the bottom shield 184 that stabilizes a magnetic seed 186 of the magnetic stack 188 via contacting adjacency. Various embodiments may configure the fixed magnetization structure 190 to tune the strength and orientation of the fixed shield magnetization 182 to stabilize other portions of the magnetic stack 188, such as the AFM 192, first and second ferromagnetic SAF layers 194, and free layer 196. Such fixed magnetization 182 tuning may be conducted by sizing the fixed magnetization structure 190, including the ferromagnetic SAF layers 198 separated by a non-magnetic spacer layer 200, with a width 202 at the ABS that is greater than an average 204 and greatest 206 stack width.

The exchange coupling provided by the contact of the magnetic seed 186 and synthetic antiferromagnet (SAF) fixed magnetization structure 190 can allow for simple, efficient production of the fixed magnetization 182 for the bottom shield 184 as ferromagnetic exchange coupling limits magnetic domain movement in the magnetic seed 186 while RKKY coupling present in the fixed magnetization structure 190 limits magnetic domain movement in the bottom shield 184. Despite the fixed magnetization 182, wider width 202, and laminated structure, the bottom shield 184 can operate in concert with side shields 208 positioned on opposite lateral sides of the magnetic stack 186 to define a magnetic extent of the free layer 196 that allows a single data bit to be sensed with a reduced shield-to-shield spacing 210 despite high areal data bit density.

The ability to tune the fixed magnetization 182 of the bottom shield 184 for strength and orientation can provide diverse magnetic stack 188 shielding that allows transducing element 180 optimization for a variety of different data storage environments. For example, the bottom shield 184 can be configured with a fixed magnetization 182 that is parallel to the ABS and Z axis, as shown, which can provide efficient shielding characteristics without degrading free layer 196 sensitivity. In some embodiments, an orthogonal or canted fixed magnetization orientation, such as an angle of approximately +/−10-80° with respect to the Z axis, can be utilized to tune the stabilization of the magnetic seed 186 while providing a bias magnetization for the magnetic stack 188.

Figure 5A:
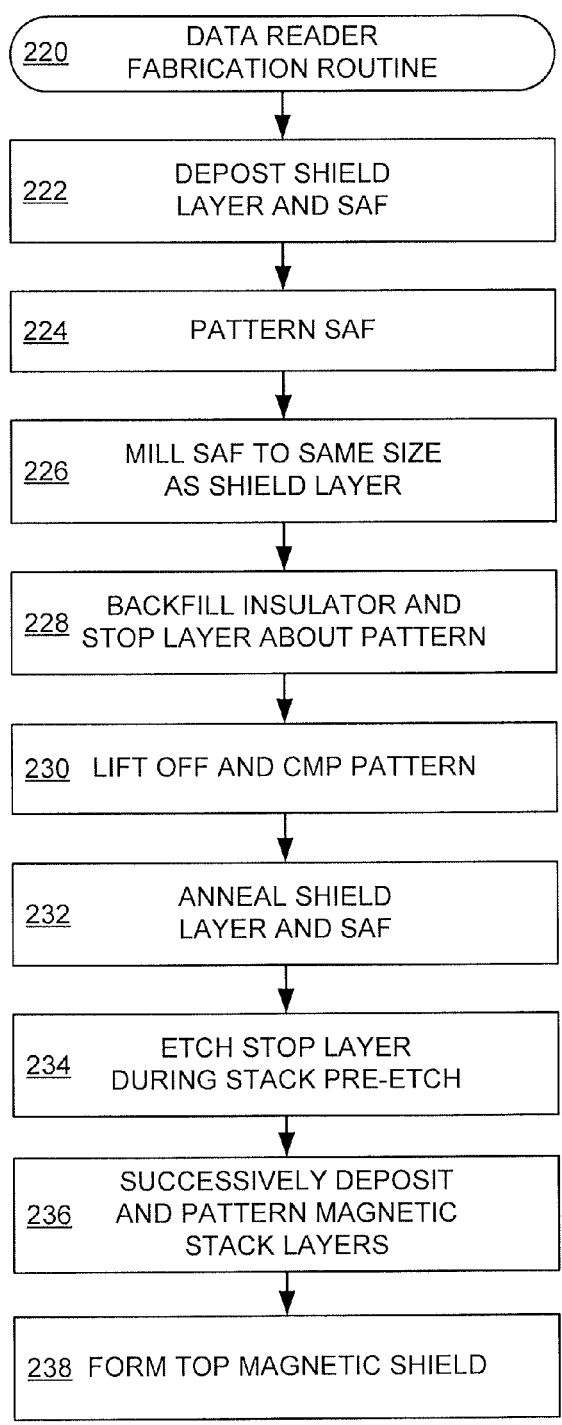
FIGS. 5A and 5B illustrate an example data reader fabrication routine carried out in accordance with various embodiments.
Figure 5B:
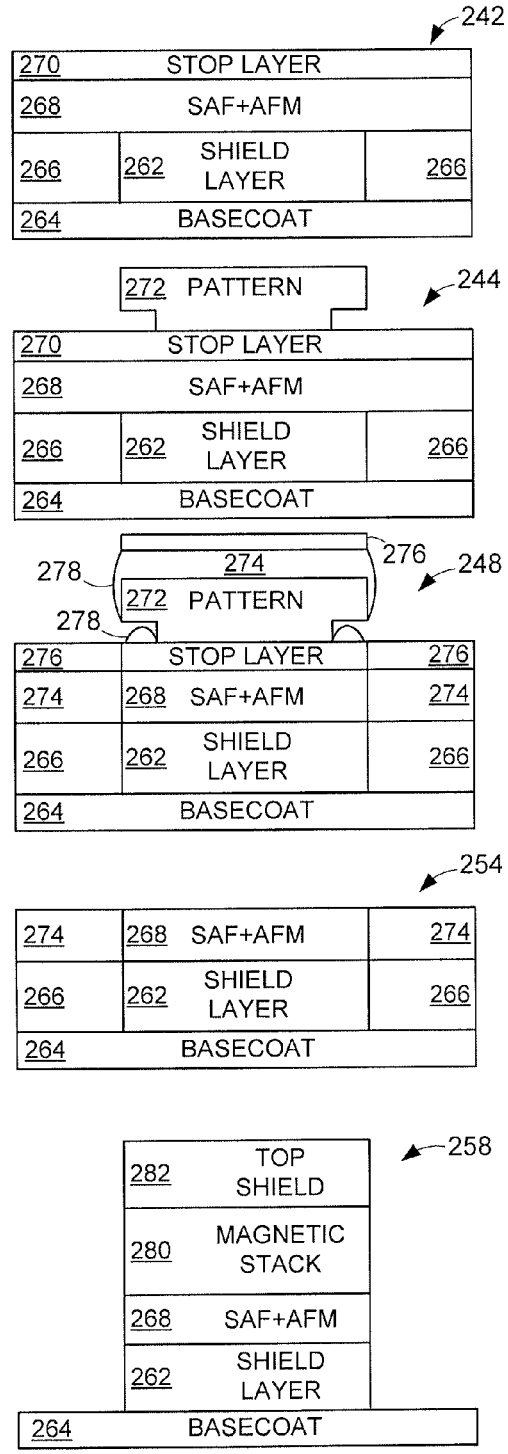

While such fixed magnetization tuning can occur at any time and with any combination of manufacturing steps, FIGS. 5A and 5B respectively illustrate an example data reader fabrication routine 220 carried out in accordance with some embodiments. In the embodiment shown in FIG. 5A, step 222 begins by depositing a shield layer and SAF structure that can function together as single bottom shield lamination. The example sheet film lamination 242 of FIG. 5B corresponds to step 222 and displays how a shield layer 262 can be formed atop a basecoat 264 and between insulating layers 266 with a SAF lamination 268 and stop layer 270 continuously spanning across the lateral insulating layers 266 above the shield layer 262.

Step 224 of FIG. 5A proceeds to pattern the SAF structure to be the same width at the ABS as the bottom shield, as shown by sheet film lamination 244 of FIG. 5B where a pattern 272 is aligned with the shield layer 262 atop the stop layer 270. Positioning of the pattern 272 allows step 226 of FIG. 5A to mill the stop layer 270 and SAF structure 268 to be the same size as the bottom shield, which can allow the SAF structure 268 to be more uniformly incorporated into the bottom shield. Various embodiments of step 226 further replace the removed portions of the SAF structure and stop layer 270, with the SAF structure by second insulating layers 274 that are vertically aligned with the first insulating layers 266.

Routine 220 then backfills a stop layer 276 and insulator material 278 about the pattern 272 in step 228, as displayed by sheet film lamination 248. The backfilling of material about the pattern 272, as shown, can allow for a lift off process to be conducted in step 230 instead of a knock off pattern removal. Such a lift off process can be simpler with less topography than a knock off process and allow a controlled chemical mechanical polish (CMP) to be conducted with predetermined parameters, like lower polish rate than for alumina and long enough duration to ensure a smooth SAF surface with no undersprayed insulating material and without damage to the SAF structure. The predetermined parameters can be tuned in accordance with various embodiments to provide magnetic stack grain growth that results in grains of a predetermined size, such as less than 12 nm grains.

With the SAF structure 268 and shield layer 262 having a predetermined texture, step 232 may conduct an annealing operation that sets a magnetization orientation in the respective magnetic structures 262 and 268, such as the magnetizations of FIG. 4. The annealing operation of step 232 can act to optimize SAF 268 surface roughness to provide predetermined grain sizes. Step 234 can subsequently etch the stop layer 270 during a magnetic stack pre-etching operation, which corresponds with sheet film lamination 254 of FIG. 5B. It should be noted that step 234 may be conducted in concert or independently of annealing operations on a magnetic stack. The plurality of annealing operations that may be applied to the shield layer 262 and serially rotate the orientation of the bottom shield fixed magnetization parallel and orthogonal to the ABS can be planned so that a predetermined fixed magnetization orientation is achieved, such as an orientation parallel to the ABS as illustrated in FIG. 4.

The formatting and tuning of the SAF 268 and shield layer 262 through various lithography and annealing operations is culminated through steps 236 and 238 that respectively deposit and pattern a magnetic stack lamination 280, like the spin valve stack 122 of FIG. 2, and a top magnetic shield 282 atop the prepared SAF surface. The sheet film lamination 258 generally shows how such steps could produce a data transducing element that is stabilized through bias magnetization provided by the SAF 268 abutted and included in the shield layer 262. The various steps of routine 220 are not required or limited. For instance, an additional annealing operation may be conducted with after deposition and patterning of the magnetic stack in step 236 to set the fixed magnetization orientation of the SAF 268 and portions of the magnetic stack 280.

Through tuned design and construction of a bottom shield to have a predetermined fixed magnetization strength and orientation, magnetic operation of the magnetic stack can be stabilized. The ability to configure the bottom shield with a fixed magnetization with a variety of magnetic orientations provided by annealing operations can allow diverse applications for magnetic shielding and biasing of the magnetic stack. Moreover, the variety of different magnetic strengths afforded by the tuned size, material, and position of the fixed magnetization structure of the bottom shield allows the magnetic stack to reliably respond to high data bity density data storage environments as magnetic noise from a magnetic seed portion of the magnetic stack is minimized.

While the embodiments herein have been directed to magnetic sensing, it will be appreciated that the technology described above can readily be utilized in any number of other applications, including data writing. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
   depositing a shield layer;
   forming a shield fixed magnetization structure atop the shield layer;
   depositing a first stop layer on the shield fixed magnetization structure;
   depositing a pattern on the shield fixed magnetization structure, the pattern shaped with a first width contacting the shield layer and a greater second width distal the shield layer, the first and second widths defining first and second notches;
   backfilling an insulating material to partially fill each notch;
   depositing a second stop layer on the insulating material and pattern;
   lifting off the pattern, insulating material, first stop layer, and second stop layer;
   forming a magnetic seed layer on the shield layer; and
   depositing a magnetic stack atop the magnetic seed layer, the magnetic stack comprising free and stack fixed magnetization structures.

2. The method of claim 1, wherein the stack fixed magnetization structure of the magnetic stack comprises a synthetic antiferromagnet (SAF).

3. The method of claim 1, further comprising disposing an antiferromagnet (AFM) between the magnetic seed and the fixed magnetization structure of the magnetic stack.

4. The method of claim 1, wherein the shield fixed magnetization structure comprising a synthetic antiferromagnet (SAF) pinned by an antiferromagnet.

5. The method of claim 1, wherein the lifting off step produces no undersprayed insulating material.

6. The method of claim 1, wherein the magnetic stack has a trapezoidal shape with the magnetic seed layer having a greater width on an air bearing surface than the free magnetization structure.

7. The method of claim 1, wherein the lifting off step produces a first texture that is less than a second texture corresponding with a knock off process.

8. The method of claim 1, wherein the magnetic stack has a grain size of less than 12 nm.

9. The method of claim 1, wherein the magnetic stack is disposed between side shields.

10. The method of claim 9, wherein each side shield is separated from the magnetic stack by an insulating layer that continuously extends to separate the respective side shields from the shield fixed magnetization structure.

11. The method of claim 1, wherein an annealing operation is conducted after the lifting off step to set a magnetization orientation in the shield fixed magnetization structure.

12. The method of claim 11, wherein the magnetization orientation is canted 10-80° with respect to an air bearing surface.

13. The method of claim 1, wherein the shield layer is coupled to the magnetic seed layer.

14. The method of claim 1, wherein the first stop layer continuously extends laterally beyond the second width of the pattern.

15. The method of claim 1, wherein an annealing operation is conducted on the shield fixed magnetization structure to provide a less than 12 nm grain size.

16. The method of claim 1, wherein a magnetic orientation for the shield fixed magnetization structure is provided by a plurality of annealing operations.

17. The method of claim 16, wherein first and second annealing operations configure the shield fixed magnetization structure with first and second fixed pinning magnetizations, the first and second fixed pinning magnetizations set to different, orthogonal orientations.

* * * * *